UNITED STATES PATENT OFFICE.

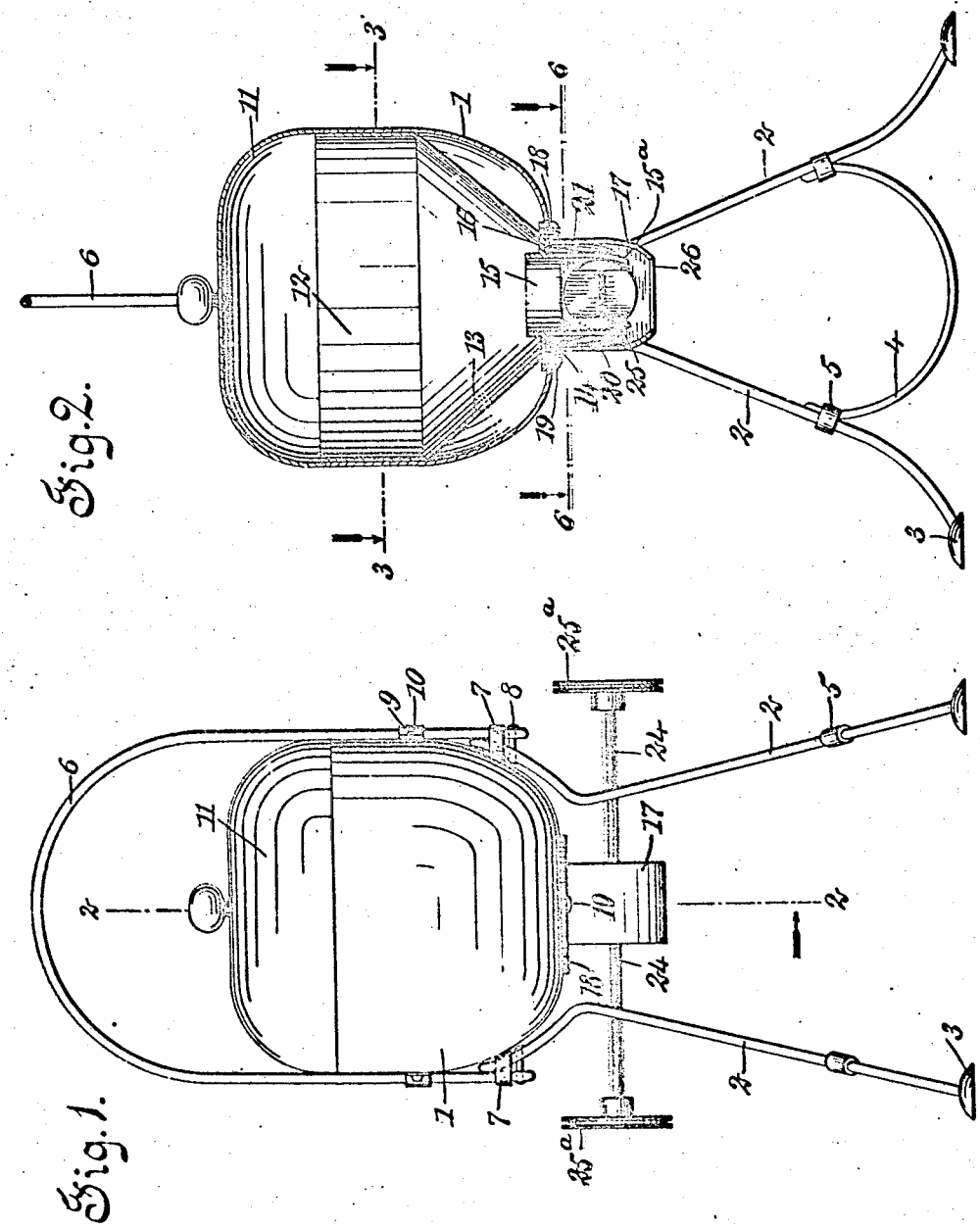

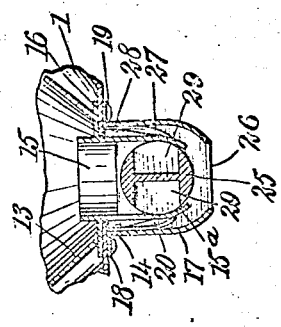

CARLOS DACOSTA AND PEDRO DACOSTA, OF CIENFUEGOS, CUBA.

DISPENSING AND MEASURING APPARATUS.

No. 895,346.  Specification of Letters Patent.  Patented Aug. 4, 1908.

Application filed July 23, 1907. Serial No. 385,124.

*To all whom it may concern:*

Be it known that we, CARLOS DACOSTA and PEDRO DACOSTA, citizens of the Republic of Cuba, and residents of Cienfuegos, Cuba, have invented a new and Improved Dispensing and Measuring Apparatus, of which the following is a full, clear, and exact description.

This invention relates to dispensing and measuring apparatus, and more particularly to that class of apparatus for dispensing and measuring granular material such as sugar, flour and the like.

The object of the invention is to provide a simple, strong and durable dispensing and measuring apparatus having manually operable means for dispensing a predetermined quantity of material from a bulk of the material contained in the receptacle of the apparatus.

A further object of the invention is to provide a device of the class described having a receptacle for containing material such as sugar and the like, a mouth-piece in which is arranged a revoluble member provided with cups for receiving a predetermined quantity of the material within the receptacle, and means for preventing the escape of material from the receptacle at the sides of the revoluble dispensing member.

The invention consists in the construction and combination of parts to be more particularly described hereinafter and fully pointed out in the claims.

Reference is to be had to the accompanying drawings forming a part of this specification, in which similar characters of reference indicate corresponding parts in all the views, and in which Figure 1 is an elevation of a receptacle having our invention applied thereto; Fig. 2 is a section on the line 2—2 of Fig. 1; Fig. 3 is a section on the line 3—3 of Fig. 2; Fig. 4 is an elevation showing parts of the invention, and with parts broken away; Fig. 5 is a vertical section of a part of the apparatus on the same line as Fig. 2, and showing a certain part in a different position; Fig. 6 is a section on the line 6—6 of Fig. 2; and Fig. 7 is a vertical section of a part of the device showing a detail of a modified form.

Before proceeding to a more detailed explanation of our apparatus it should be understood that the principle underlying our invention is applicable to a number of different uses and that certain of the details of construction are not essential to the principle involved, but can be varied at will.

In the form of apparatus illustrated in the accompanying drawings the invention is shown applied to a small receptacle for sugar, salt, or the like, to be used for instance at meals. In this device the granular material is dispensed from the receptacle in small quantities, equivalent, for instance, to teaspoonfuls. It will be readily comprehended that the same idea is applicable to bins or receptacles for holding sugar, flour, tea, coffee, and many other similar substances, in bulk. When applied to receptacles of this character the invention is particularly useful in vending merchandise, dispensing stores, and the like.

Referring more particularly to the drawings, 1 represents a receptacle which may be of any suitable form and material. The receptacle is mounted upon supports 2, consisting in the present instance of inverted V-shaped members having laterally disposed feet 3. The legs of the V-shaped members are joined by braces 4 held in position by band collars 5. At the apexes, the inverted V-shaped members carry the extremities of an inverted U-shaped handle 6 joined to the supports by means of collars 7 and rivets 8.
The handle is fastened to the receptacle by means of brackets 9 mounted upon the sides of the receptacle by means of rivets 10. The receptacle has a cover 11 adapted to be removably arranged at the upper edge of the receptacle and engaging the edge of a hopper 12 located within the receptacle and extending above the edge of the latter. The form of the receptacle and its lid together with the supporting members and the handle, can be varied to suit convenience or taste and forms no material part of our invention.

The hopper 12 arranged within the receptacle has a lower funnel shaped part 13 extending toward an opening 14 at the bottom of the receptacle. The hopper may be of any suitable material, for instance, sheet metal. A sleeve 15 of similar or other suitable material is arranged within the opening 14 and has a lateral, annular flange 16 engaging the bottom of the receptacle at the inner side, adjacent to the edges of the opening 14. The sleeve has extensions 15$^a$ at opposite sides which project beyond the opening and are arranged in a mouth-piece 17 which is preferably of rectangular crosssection. The mouth-piece 17 has lateral flanges 18 which are secured to the under side of the bottom of the receptacle by means of screws 19 passing through the same and penetrating the bottom of the receptacle to engage the flange 16 of the sleeve, whereby the latter is also held in position. It will be understood that the mouth-piece is arranged about the opening 14 of the receptacle. At opposite ends, the mouth-piece has openings 20 therethrough which are closed by tapered plates 21 integral with the sleeve 15. At the lower edges of the openings 20 are semicircular bearing recesses 22 which register with similar recesses 23 at the lower edges of the plates 21. The recesses 22 and 23 form circular bearings in which are revolubly arranged shafts 24 which carry rigidly, a revoluble cylindrical dispensing member 25 arranged between the opposite extensions 15ª; the latter engage the cylindrical member longitudinally thereof and constitute guards which prevent the escape of material from the hopper at the sides of the member. The ends of the member engage the ends of the mouth-piece and the plates 21, whereby the escape of material at the ends is prevented. At the outer ends the shafts 24 have wheels or thumb-nuts 25ª by means of which the cylindrical dispensing member can be manually operated.

The mouth-piece has a discharge opening 26 at the lower end through which the material dispensed is discharged. Supporting spring plates 27 are arranged between the sides of the mouth-piece and the guards 15ª and are secured to the former by means of rivets 28. The spring plates press against the guards and hold them in engagement with the cylindrical dispensing member. The latter has diametrically opposed recesses or cups 29, which may be of any suitable size and may vary in number.

In operation, the dispensing member is simply turned by means of one or the other of the wheels 25ª so that a cup which receives a charge from the hopper is rotated into position to discharge through the opening 26 of the mouth-piece. As the cups are diametrically opposed one will always be filled while the other is discharged, so that in dispensing a cupful from the receptacle a half turn only, of the shaft is necessary. The sleeve, mouth-piece, and other dispensing parts can be fashioned from any suitable material such as sheet metal, cast metal and the like.

In the modified form shown in Fig. 7 we provide strips of felt or other suitable fabric 15ᵇ, between the extensions 15ª of the sleeve 15 and the dispensing member 25. The strips of fabric insure the tight fit of the dispensing member, and prevent escape of particles of the material at the sides of the member 25.

Having thus described our invention, we claim as new and desire to secure by Letters Patent:—

1. In a device of the class described, a receptacle having an opening, a hollow member arranged at said opening and having opposite extensions, a revoluble member forming a cup and arranged between said opposite extensions, said opposite extensions engaging said member to constitute guards to prevent the escape of material at the sides thereof, and resilient means for holding said opposite extensions in engagement with said member, said hollow member constituting an outlet for said receptacle.

2. In a device of the class described, a receptacle having an opening, a sleeve arranged within said opening and engaging said receptacle, said sleeve having downwardly disposed extensions, a mouth-piece mounted at said opening, a revoluble member having a cup and arranged within said mouth-piece between said extensions, the said extensions engaging said member and constituting guards to prevent the escape of material at the sides thereof, and resilient means for holding said extensions in engagement with said member.

3. In a device of the class described, a receptacle having an opening, a hopper within said receptacle discharging at said opening, a sleeve within said opening and having extensions therebeyond, a mouth-piece arranged at said opening and having openings at the ends thereof, said sleeve having plates closing said openings at the ends of said mouth-piece, recesses at adjacent edges of said openings of said ends and said plates, said recesses registering and constituting bearings, a shaft mounted in said bearings and having a revoluble dispensing member within said mouth-piece between said extensions, said dispensing member having cups, said extensions engaging said dispensing members to prevent the escape of the material at the sides thereof, and springs between the sides of said mouth-piece and said extensions to hold said extensions in engagement with said member.

In testimony whereof we have signed our names to this specification in the presence of two subscribing witnesses.

CARLOS DACOSTA.
PEDRO DACOSTA.

Witnesses:
MANUEL B. POSADO,
B. CARBO.